(12) United States Patent
Cameron

(10) Patent No.: US 9,156,167 B2
(45) Date of Patent: Oct. 13, 2015

(54) DETERMINING AN AUTONOMOUS POSITION OF A POINT OF INTEREST ON A LIFTING DEVICE

(75) Inventor: John F. Cameron, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 3 days.

(21) Appl. No.: 11/803,830

(22) Filed: May 15, 2007

(65) Prior Publication Data

US 2008/0288125 A1 Nov. 20, 2008

(51) Int. Cl.
*B25J 9/16* (2006.01)
*G05B 19/18* (2006.01)

(52) U.S. Cl.
CPC ..... *B25J 9/1676* (2013.01); *G05B 2219/39091* (2013.01); *G05B 2219/39259* (2013.01); *G05B 2219/40476* (2013.01); *G05B 2219/45046* (2013.01); *G05B 2219/49139* (2013.01)

(58) Field of Classification Search
CPC .................... B25J 9/1676; G05B 2219/39091; G05B 2219/39259; G05B 2219/40476; G05B 2219/45046; G05B 2219/49139
USPC .................... 701/50, 213, 214; 212/270, 276; 702/127, 150
See application file for complete search history.

(56) References Cited

U.S. PATENT DOCUMENTS

| | | | |
|---|---|---|---|
| 3,796,322 A * | 3/1974 | Cording | .......... 212/282 |
| 4,178,591 A | 12/1979 | Geppert | |
| 4,752,012 A | 6/1988 | Juergens | |
| 4,857,753 A * | 8/1989 | Mewburn-Crook et al. | .... 290/55 |
| 5,095,531 A | 3/1992 | Ito | |
| 5,224,388 A | 7/1993 | Pratt | |
| 5,359,542 A | 10/1994 | Pahmeier et al. | |
| 5,381,136 A | 1/1995 | Powers et al. | |
| 5,491,486 A | 2/1996 | Welles, II | |
| 5,634,565 A | 6/1997 | Kesage | |
| 5,640,452 A | 6/1997 | Murphy | |
| 5,650,770 A | 7/1997 | Schlager et al. | |
| 5,752,197 A | 5/1998 | Ratioula | |
| 5,859,839 A | 1/1999 | Ahlenius et al. | |
| 5,883,817 A | 3/1999 | Chisholm et al. | |
| 5,890,091 A | 3/1999 | Talbot et al. | |
| 5,917,405 A | 6/1999 | Joao | |

(Continued)

FOREIGN PATENT DOCUMENTS

JP        05286692 A  *  11/1993
JP        2000/048283    2/2000

(Continued)

OTHER PUBLICATIONS

"Anti-Collision Systems A Clash of Cultures", http://www.cranestodaymagazine.com/story.asp?sectionCode=66&storyCode=2043070, (Mar. 21, 2007),6.

(Continued)

*Primary Examiner* — Janet Suglo

(57) ABSTRACT

A system and method for monitoring a lifting device is disclosed. The method receives location information from a position determiner module coupled with a point of interest associated with the lifting device and determines an autonomous position of the point of interest based on the location information. The method further includes monitoring the lifting device based on the autonomous position of the point of interest.

67 Claims, 9 Drawing Sheets

(56) References Cited

U.S. PATENT DOCUMENTS

| | | | |
|---|---|---|---|
| 5,987,379 A | 11/1999 | Smith | |
| 6,016,117 A | 1/2000 | Nelson, Jr. | |
| 6,046,687 A | 4/2000 | Janky | |
| 6,052,925 A | 4/2000 | Reiners | |
| 6,064,335 A | 5/2000 | Eschenbach | |
| 6,067,031 A | 5/2000 | Janky et al. | |
| 6,076,030 A | 6/2000 | Rowe | |
| 6,118,196 A * | 9/2000 | Cheng-Yon | 310/75 C |
| 6,124,825 A | 9/2000 | Eschenbach | |
| 6,144,307 A | 11/2000 | Elliot | |
| 6,166,688 A | 12/2000 | Cromer et al. | |
| 6,243,648 B1 | 6/2001 | Kilfeather et al. | |
| 6,268,804 B1 | 7/2001 | Janky et al. | |
| 6,297,744 B1 | 10/2001 | Baillargeon et al. | |
| 6,301,616 B1 | 10/2001 | Pal et al. | |
| 6,317,500 B1 | 11/2001 | Murphy | |
| 6,320,273 B1 * | 11/2001 | Nemec | 290/55 |
| 6,330,149 B1 * | 12/2001 | Burrell | 361/683 |
| 6,356,196 B1 | 3/2002 | Wong et al. | |
| 6,362,736 B1 | 3/2002 | Gehlot | |
| 6,377,165 B1 | 4/2002 | Yoshioka et al. | |
| 6,439,515 B1 | 8/2002 | Powers | |
| 6,453,237 B1 | 9/2002 | Fuchs et al. | |
| 6,459,988 B1 | 10/2002 | Fan et al. | |
| 6,480,788 B2 | 11/2002 | Kilfeather et al. | |
| 6,496,766 B1 | 12/2002 | Bernold et al. | |
| 6,501,421 B1 | 12/2002 | Dutta | |
| 6,505,049 B1 | 1/2003 | Dorenbosch | |
| 6,512,465 B2 | 1/2003 | Flick | |
| 6,529,127 B2 | 3/2003 | Townsend et al. | |
| 6,539,307 B1 | 3/2003 | Holden et al. | |
| 6,560,536 B1 | 5/2003 | Sullivan et al. | |
| 6,609,064 B1 | 8/2003 | Dean | |
| 6,650,242 B2 | 11/2003 | Clerk et al. | |
| 6,651,000 B2 | 11/2003 | Diggelen et al. | |
| 6,657,587 B1 | 12/2003 | Mohan | |
| 6,658,336 B2 | 12/2003 | Browne et al. | |
| 6,658,349 B2 | 12/2003 | Cline | |
| 6,675,095 B1 | 1/2004 | Bird et al. | |
| 6,677,938 B1 | 1/2004 | Maynard | |
| 6,700,533 B1 | 3/2004 | Werb et al. | |
| 6,700,762 B2 | 3/2004 | Underwood et al. | |
| 6,725,158 B1 | 4/2004 | Sullivan et al. | |
| 6,801,853 B2 | 10/2004 | Workman | |
| 6,804,602 B2 | 10/2004 | Impson et al. | |
| 6,826,452 B1 * | 11/2004 | Holland et al. | 700/245 |
| 6,829,535 B2 | 12/2004 | Diggelen et al. | |
| 6,843,383 B2 | 1/2005 | Schneider et al. | |
| 6,864,789 B2 | 3/2005 | Wolfe | |
| 6,865,169 B1 | 3/2005 | Quayle et al. | |
| 6,934,629 B1 | 8/2005 | Chisholm et al. | |
| 6,970,801 B2 * | 11/2005 | Mann | 702/150 |
| 6,975,941 B1 | 12/2005 | Lau et al. | |
| 6,981,423 B1 | 1/2006 | Discenzo | |
| 7,020,555 B1 * | 3/2006 | Janky et al. | 701/213 |
| 7,031,883 B1 | 4/2006 | Lee | |
| 7,032,763 B1 * | 4/2006 | Zakula et al. | 212/344 |
| 7,034,683 B2 | 4/2006 | Ghazarian | |
| 7,050,907 B1 | 5/2006 | Janky et al. | |
| 7,070,060 B1 * | 7/2006 | Feider et al. | 212/291 |
| 7,082,359 B2 | 7/2006 | Breed | |
| 7,089,099 B2 | 8/2006 | Shostak et al. | |
| 7,091,851 B2 | 8/2006 | Mason et al. | |
| 7,092,846 B2 | 8/2006 | Vock et al. | |
| 7,095,368 B1 | 8/2006 | Diggelen | |
| 7,095,370 B1 | 8/2006 | Diggelen et al. | |
| 7,135,976 B2 | 11/2006 | Neff et al. | |
| 7,158,883 B2 | 1/2007 | Fuchs et al. | |
| 7,212,120 B2 | 5/2007 | Gudat | |
| 7,289,875 B2 * | 10/2007 | Recktenwald et al. | 700/213 |
| 7,295,855 B1 | 11/2007 | Larsson et al. | |
| 7,298,319 B2 | 11/2007 | Han et al. | |
| 7,308,114 B2 | 12/2007 | Takehara et al. | |
| 7,313,476 B2 | 12/2007 | Nichols et al. | |
| 7,324,921 B2 | 1/2008 | Sugahara et al. | |
| 7,344,037 B1 * | 3/2008 | Zakula et al. | 212/344 |
| 7,367,464 B1 * | 5/2008 | Agostini et al. | 212/308 |
| 7,398,153 B2 | 7/2008 | Workman et al. | |
| 7,472,009 B2 | 12/2008 | Baldwin | |
| 7,486,174 B2 | 2/2009 | Battista et al. | |
| 7,493,112 B2 | 2/2009 | Adachi et al. | |
| 7,548,200 B2 | 6/2009 | Garin | |
| 7,548,816 B2 | 6/2009 | Riben et al. | |
| 7,574,300 B2 | 8/2009 | Twitchell et al. | |
| 7,633,389 B2 | 12/2009 | Mantovani et al. | |
| 7,639,181 B2 | 12/2009 | Wang et al. | |
| 7,667,642 B1 | 2/2010 | Frericks et al. | |
| 7,710,317 B2 | 5/2010 | Cheng et al. | |
| 7,719,416 B2 | 5/2010 | Arms et al. | |
| 7,868,755 B2 | 1/2011 | Hanai et al. | |
| 8,164,431 B2 | 4/2012 | Morgan et al. | |
| 8,164,454 B2 | 4/2012 | Teller | |
| 2002/0070856 A1 | 6/2002 | Wolfe | |
| 2002/0082036 A1 | 6/2002 | Ida et al. | |
| 2002/0117609 A1 | 8/2002 | Thibault et al. | |
| 2002/0142788 A1 | 10/2002 | Chawla et al. | |
| 2002/0196151 A1 | 12/2002 | Troxler | |
| 2003/0045314 A1 | 3/2003 | Burgan et al. | |
| 2003/0064744 A1 | 4/2003 | Zhang et al. | |
| 2003/0073435 A1 | 4/2003 | Thompson et al. | |
| 2003/0119445 A1 | 6/2003 | Bromham et al. | |
| 2004/0024522 A1 | 2/2004 | Walker et al. | |
| 2004/0034470 A1 | 2/2004 | Workman | |
| 2004/0044911 A1 | 3/2004 | Takada et al. | |
| 2004/0148083 A1 | 7/2004 | Arakawa et al. | |
| 2004/0177032 A1 | 9/2004 | Bradley et al. | |
| 2004/0196182 A1 * | 10/2004 | Unnold | 342/357.07 |
| 2004/0219927 A1 | 11/2004 | Sumner | |
| 2004/0243285 A1 | 12/2004 | Gounder | |
| 2005/0021245 A1 | 1/2005 | Furuno et al. | |
| 2005/0030175 A1 | 2/2005 | Wolfe | |
| 2005/0055161 A1 * | 3/2005 | Kalis et al. | 701/213 |
| 2005/0095985 A1 | 5/2005 | Hafeoz | |
| 2005/0103738 A1 * | 5/2005 | Recktenwald et al. | 212/275 |
| 2005/0116105 A1 * | 6/2005 | Munk et al. | 244/123 |
| 2005/0137742 A1 * | 6/2005 | Goodman et al. | 700/214 |
| 2005/0147062 A1 | 7/2005 | Khouaja et al. | |
| 2005/0154904 A1 | 7/2005 | Perepa et al. | |
| 2005/0179541 A1 | 8/2005 | Wolfe | |
| 2005/0195101 A1 | 9/2005 | Stevens et al. | |
| 2005/0237154 A1 | 10/2005 | Kafry | |
| 2005/0242052 A1 * | 11/2005 | O'Connor et al. | 212/344 |
| 2005/0264416 A1 | 12/2005 | Maurer | |
| 2006/0027677 A1 * | 2/2006 | Abts | 239/67 |
| 2006/0109106 A1 | 5/2006 | Braun | |
| 2006/0145863 A1 | 7/2006 | Martin et al. | |
| 2006/0181452 A1 | 8/2006 | King et al. | |
| 2006/0238309 A1 | 10/2006 | Takatama | |
| 2006/0243056 A1 | 11/2006 | Sundermeyer et al. | |
| 2007/0005244 A1 | 1/2007 | Nadkarni | |
| 2007/0143207 A1 | 6/2007 | Breen | |
| 2007/0202861 A1 | 8/2007 | Adachi et al. | |
| 2007/0210920 A1 | 9/2007 | Panotopoulos | |
| 2007/0255498 A1 * | 11/2007 | McDaniel et al. | 701/301 |
| 2008/0014965 A1 | 1/2008 | Dennison et al. | |
| 2008/0036617 A1 | 2/2008 | Arms et al. | |
| 2008/0040244 A1 | 2/2008 | Ricciuti et al. | |
| 2008/0061959 A1 | 3/2008 | Breed | |
| 2008/0084332 A1 | 4/2008 | Ritter et al. | |
| 2008/0086508 A1 | 4/2008 | Ballew | |
| 2008/0086509 A1 | 4/2008 | Wallace | |
| 2008/0086685 A1 | 4/2008 | Janky et al. | |
| 2008/0100977 A1 | 5/2008 | Shreiner et al. | |
| 2008/0103660 A1 | 5/2008 | Browne et al. | |
| 2008/0122234 A1 | 5/2008 | Alioto et al. | |
| 2008/0221836 A1 | 9/2008 | Tateson | |
| 2008/0221943 A1 | 9/2008 | Porter et al. | |
| 2008/0238657 A1 | 10/2008 | Hupp et al. | |
| 2008/0281618 A1 | 11/2008 | Mermet et al. | |
| 2009/0009389 A1 | 1/2009 | Mattos | |
| 2009/0099774 A1 | 4/2009 | Takac et al. | |
| 2009/0109049 A1 | 4/2009 | Frederick et al. | |
| 2009/0134997 A1 | 5/2009 | Godlewski | |
| 2009/0189784 A1 | 7/2009 | Lindgren | |

(56) References Cited

U.S. PATENT DOCUMENTS

| | | |
|---|---|---|
| 2009/0195356 A1 | 8/2009 | Tuttle |
| 2009/0295633 A1 | 12/2009 | Pinto et al. |
| 2010/0049366 A1 | 2/2010 | Lee et al. |
| 2010/0100338 A1 | 4/2010 | Vik et al. |
| 2010/0121504 A1 | 5/2010 | Jones et al. |
| 2010/0127927 A1 | 5/2010 | Rousset |
| 2010/0255781 A1 | 10/2010 | Wirola et al. |
| 2011/0100124 A1 | 5/2011 | Zadesky et al. |
| 2011/0267174 A1 | 11/2011 | Davis |

FOREIGN PATENT DOCUMENTS

| | | |
|---|---|---|
| JP | 2000/249752 | 9/2000 |
| JP | 2002/197593 | 7/2002 |
| JP | 2002/197595 | 7/2002 |
| JP | 2002/217811 | 8/2002 |
| WO | 00/68907 | 11/2000 |
| WO | WO-02/35492 | 5/2002 |
| WO | WO-03/007261 | 1/2003 |
| WO | WO-2004/017272 | 2/2004 |
| WO | WO-2004/083888 | 9/2004 |
| WO | WO-2009/084820 | 7/2009 |

OTHER PUBLICATIONS

"Tower Cranes Anti-Collision and Zone Protection System", www.tac3000.com, (2004),36.

Abderrahim, M. et al., "A Mechatronics Security System for the Construction Site", www.elsevier.com/locate/autcon, (Sep. 7, 2004),460-466.

"Highland Man's Invention Success With Dewalt", http://www.heraldextra.com/content/view/195674/4/, (Oct. 8, 2006),3.

* cited by examiner

400
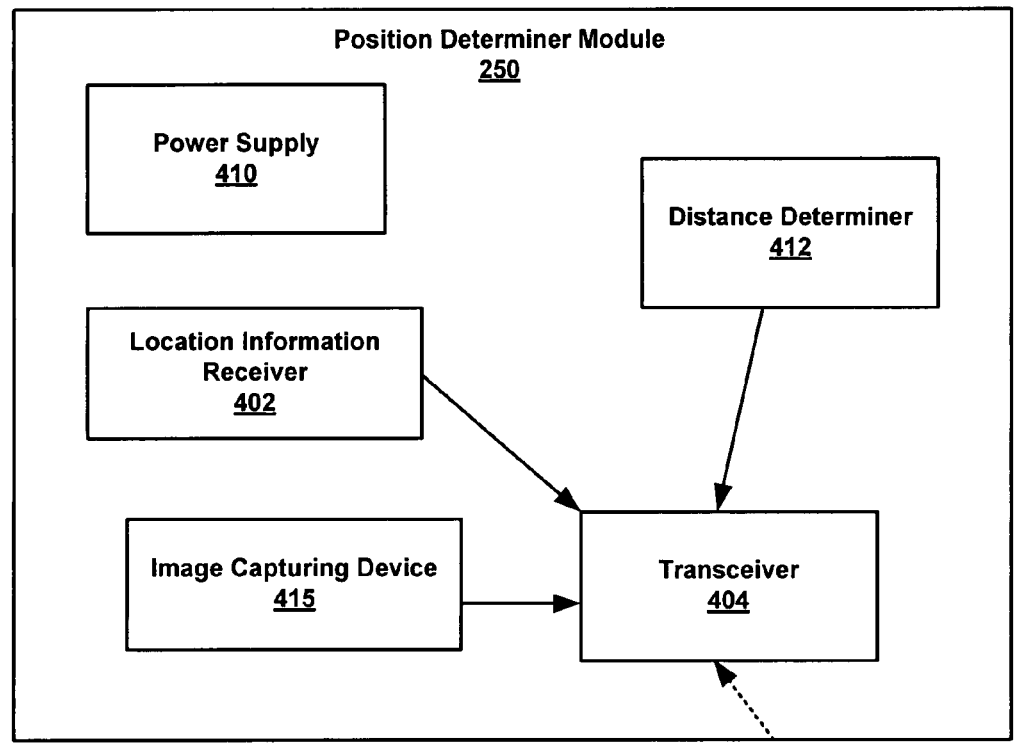
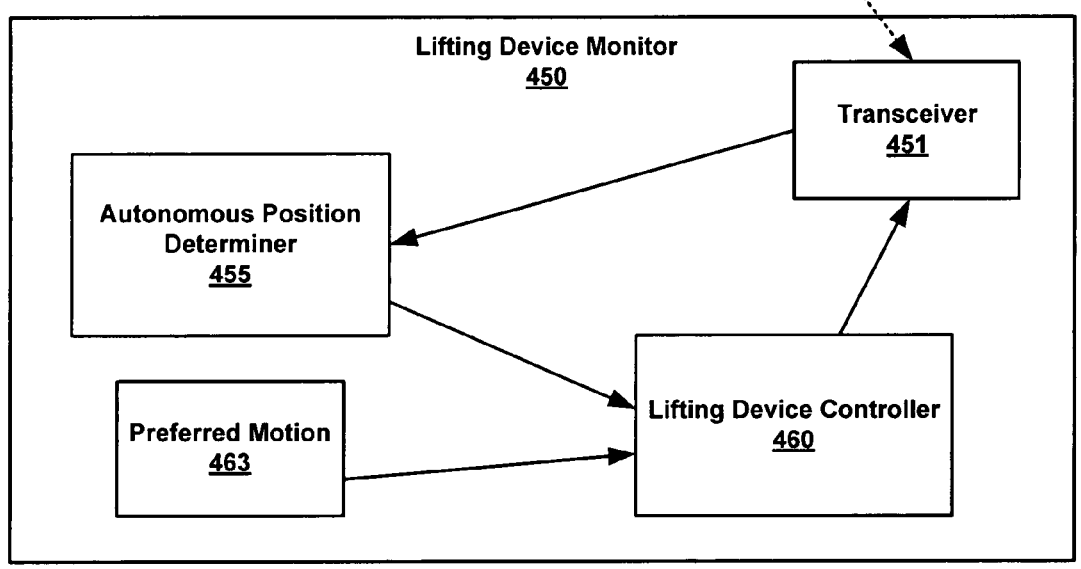
FIG. 4

600

```
┌─────────────────────────────────────┐
│ Determining at least one preferred  │
│ movement of a first point of        │
│ interest of the lifting device for  │
│ moving an object from a first point │
│ to a second point.                  │
│ 602                                 │
└─────────────────────────────────────┘
                 │
                 ▼
┌─────────────────────────────────────┐
│ Receiving location information from │
│ a position determiner module        │
│ coupled to the first point of       │
│ interest.                           │
│ 604                                 │
└─────────────────────────────────────┘
                 │
                 ▼
┌─────────────────────────────────────┐
│ Determining an autonomous position  │
│ of the first point of interest      │
│ based on the location information.  │
│ 606                                 │
└─────────────────────────────────────┘
                 │
                 ▼
┌─────────────────────────────────────┐
│ Monitoring the autonomous position  │
│ of the first point of interest with │
│ respect to the preferred movement.  │
│ 608                                 │
└─────────────────────────────────────┘
```

FIG. 6

DETERMINING AN AUTONOMOUS POSITION OF A POINT OF INTEREST ON A LIFTING DEVICE

BACKGROUND

Cranes are used in many different applications. For example, on construction sites, cranes are used to move large and/or heavy objects from one location to another. One important objective when operating a crane is to avoid collisions with other cranes and/or objects on the site, since collisions can be very hazardous and expensive.

To avoid collisions, a crane is operated manually by a human operator located inside a cab of the crane. Some times, the human operator can not see the load being moved and relies on directions from ground spotters that have visual contact with the load to operate the crane.

In addition to directions provided by ground spotters, locations of various components of the crane are provided to the crane operator to help prevent collisions. Typically, mechanical sensors are used to extrapolate a position of a component based on mechanical relationships between various components of the crane. For example, the height of an object being lifted can be determined based on the length of cable paid out from the crane.

One problem with this approach is that it is possible for the mechanical sensors to provide inaccurate information. In the example above, a mechanical sensor may not take into account the stretch of the cable and thus the height information provided to the operator could be inaccurate. In addition, since the mechanical sensors rely on physical relationships between various components, deflection of the components due to wind or other factors can lead to inaccurate readings from the mechanical sensors.

Inaccurate location information of crane components can lead to problems such as collisions with other objects and/or crane failures. The result of crane collisions and/or failures can be deadly and financially costly.

DISCLOSURE OF THE INVENTION

A system and method for monitoring a lifting device is disclosed. The method receives location information from a position determiner module coupled with a point of interest associated with the lifting device and determines an autonomous position of the point of interest based on the location information. The method further includes monitoring the lifting device based on the autonomous position of the point of interest.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

FIG. 4 is a block diagram of an exemplary system for monitoring a lifting device including monitoring an autonomous point of interest of the lifting device in accordance with embodiments of the present invention.

FIG. 6 is a flow diagram of an exemplary method for monitoring a lifting device with respect to a preferred movement in accordance with embodiments of the present invention.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, objects, and circuits have not been described in detail as not to unnecessarily obscure aspects of the present invention.

Exemplary Computer System

Figure 1:
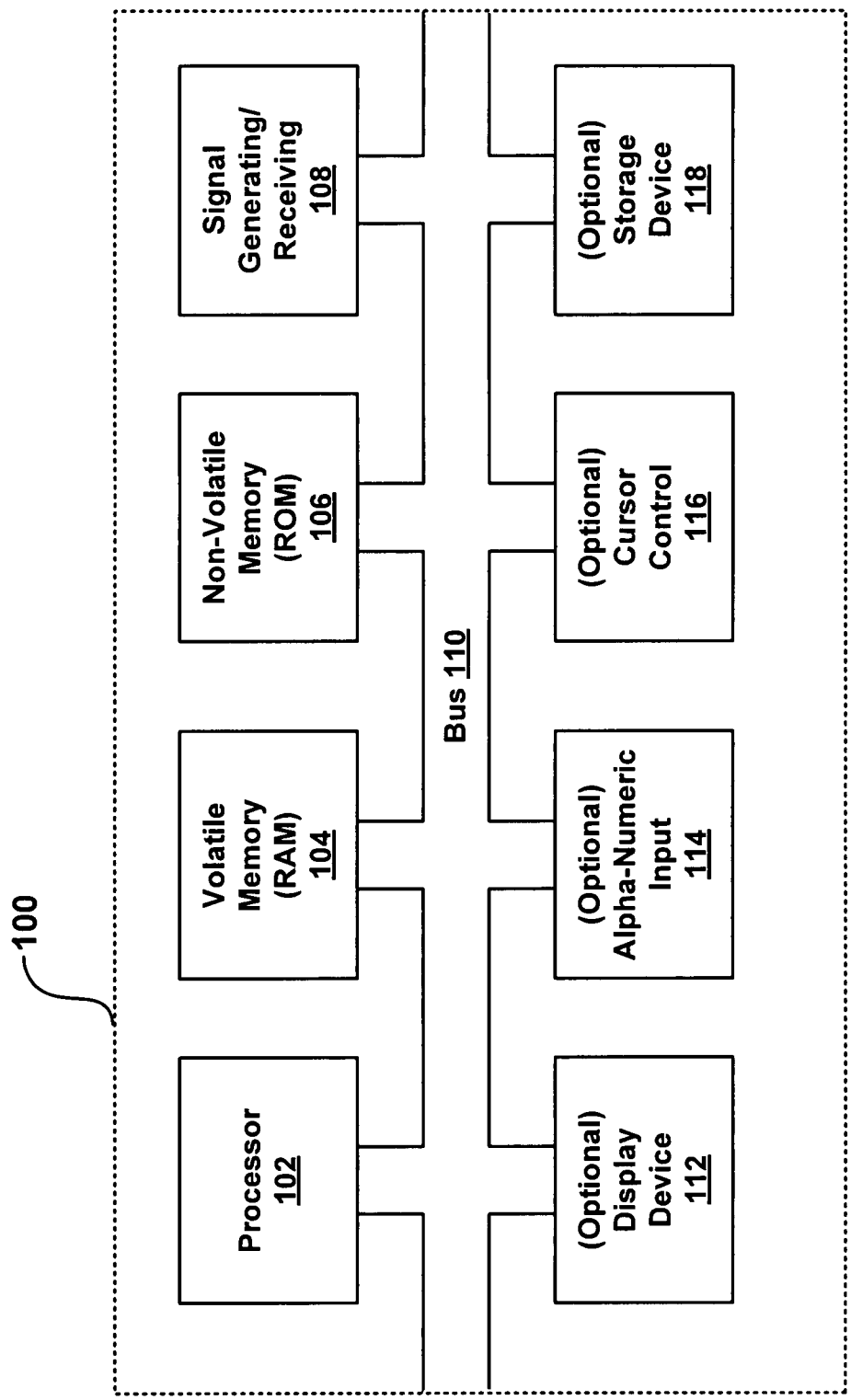
FIG. 1 is a block diagram of an exemplary computer used in accordance with embodiments of the present invention.

With reference now to FIG. 1, a block diagram of an embodiment of an exemplary computer system 100 used in accordance with the present invention. It should be appreciated that computing system 100 is not strictly limited to be a computer system. As such, computing system 100 of the present embodiment may be well suited to be any type of computing device (e.g., server computer, portable computing device, desktop computer, mobile phone, pager, personal digital assistant, etc.). Within the present discussions of the present invention, certain processes and steps are discussed that are realized, in one embodiment, as a series of instructions (e.g., software program) that reside within computer readable memory units and executed by a processor(s) of computing system 100. When executed, the instructions cause computer system 100 to perform specific actions and exhibit specific behavior that may be described in detail herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. The computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Computer system 100 also includes one or more signal generating and receiving devices 108 coupled with bus 110 for enabling computer system 100 to interface with other electronic devices and computer systems. The communication interface(s) 108 of the present embodiment may include wired and/or wireless communication technology.

Optionally, computer system 100 may include an alphanumeric input device 114 including alphanumeric and function keys coupled to the bus 110 for communicating information and command selections to the central processor(s) 102. The computer system 100 can include an optional cursor control or cursor directing device 116 coupled to the bus 110 for communicating user input information and command selections to the central processor(s) 102. The cursor-directing device 116 may be implemented using a number of well-known devices such as a mouse, a track-ball, a track-pad, an optical tracking device, and a touch screen, among others. Alternatively, it may be appreciated that a cursor may be directed and/or activated via input from the alphanumeric input device 114 using special keys and key sequence commands. The present embodiment is also well suited to directing a cursor by other means such as, for example, voice commands.

The computing system 100 of FIG. 1 may also include one or more optional computer usable data storage devices 118 such as a magnetic or optical disk and disk drive (e.g., hard drive or floppy diskette) coupled with bus 110 for storing information and instructions. An optional display device 112 may be coupled to bus 110 of computing system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Overview

Embodiments of the present invention enable the determination of an autonomous position of a point of interest on a lifting device. For purposes of the present invention, an autonomous position is the actual or physical location of the point of interest in space. The autonomous position of the present invention takes into account bending and stretching of the components of the lifting device which enables improved control and improved safety of lifting mechanisms, such as cranes. The autonomous position is not dependent on physical interactions and/or relationship between components of the lifting device.

Embodiments of the present invention enable safer and more efficient operation of a lifting device, which results in lower operating cost and improved safety because the lifting device can be monitored and controlled based on autonomous positions instead of extrapolated positions that are based on mechanical relationships, as with conventional systems.

For purposes of describing the present invention, the lifting device is a crane. However, it is appreciated that embodiments of the present invention can be used on many configurations of lifting devices and/or heavy machinery where knowing the autonomous position of an object is beneficial to controlling and monitoring the device.

In one embodiment, Global Navigation Satellite Service (GNSS) data is used to determine the autonomous position of a point of interest on a crane. As discussed herein, GNSS data may comprise data collected by a data collector or control system configured to receive information from one or more satellite navigation systems, such as: the Galileo satellite navigation system, the Global Positioning Satellite (GPS) satellite navigation system, the Glonass satellite navigation system, and/or a terrestrial augmentation to one or more of these systems.

It is appreciated that many different systems and methods for receiving GNSS data and/or other position information and processing GNSS data or other position data are well known and can be used in accordance with embodiments of the present invention for monitoring a lifting device based on the autonomous position of a point of interest.

It is appreciated that there are many well known systems and methods for transmitting location data from a receiver system such as a GPS receiver to a remote base station that can be used in accordance with embodiments of the present invention. For example, embodiments of the present invention are well suited for wireless transmission of location information to a base station where at the lifting device can be monitored based on the autonomous position of a point of interest on the lifting device.

For purposes of clarity and brevity, embodiments of the present invention describe the use of a GPS device coupled to a point of interest on a crane to determine the autonomous position of the point of interest. However, it is appreciated that any number of devices can be used to determine the autonomous position of the point of interest. For example, the autonomous position of a point of interest could be determined by triangulating a signal at or from the point of interest. A cellular phone, for example, could be used to determine a position based on triangulating a signal from the point of interest.

The signal could be generated by, for example, a cellular phone or other signal generating devices. It is also appreciated that motion of the lifting device can be monitored with, for example, accelerometers and/or inertia sensors. These sensors can be used in place of the GNSS receiver or can be used in conjunction with the GNSS receiver in accordance with the present invention. It is appreciated that the GNSS information can be used to calibrate other sensors, such as conventional mechanical sensors coupled with the lifting device in accordance with embodiments of the present invention.

Differential GPS

Embodiments of the present invention can use Differential GPS to determine the autonomous position of a point of interest in accordance with embodiments of the present invention. Differential GPS (DGPS) utilizes a reference station which is located at a surveyed position to gather data and deduce corrections for the various error contributions which reduce the precision of determining a position fix. For example, as the GPS signals pass through the ionosphere and troposphere, propagation delays may occur. Other factors which may reduce the precision of determining a position fix may include satellite clock errors, GPS receiver clock errors, and satellite position errors (ephemeredes).

The reference station receives essentially the same GPS signals as rovers which may also be operating in the area. However, instead of using the timing signals from the GPS satellites to calculate its position, it uses its known position to calculate timing. In other words, the reference station determines what the timing signals from the GPS satellites should be in order to calculate the position at which the reference station is known to be. The difference between the received GPS signals and what they optimally should be is used as an error correction factor for other GPS receivers in the area. Typically, the reference station broadcasts the error correction to, for example, a rover which uses this data to determine its position more precisely. Alternatively, the error corrections may be stored for later retrieval and correction via post-processing techniques.

Real Time Kinematic System

An improvement to DGPS methods is referred to as Real-time Kinematic (RTK). As in the DGPS method, the RTK method, utilizes a reference station located at determined or surveyed point. The reference station collects data from the same set of satellites in view by the rovers in the area. Measurements of GPS signal errors taken at the reference station (e.g., dual-frequency code and carrier phase signal errors) and broadcast to one or more rovers working in the area. The rover(s) combine the reference station data with locally collected position measurements to estimate local carrier-phase ambiguities, thus allowing a more precise determination of the rovers position. The RTK method is different from DGPS methods in that the vector from a reference station to a rover is determined (e.g., using the double differences method). In DGPS methods, reference stations are used to calculate the changes needed in each pseudorange for a given satellite in view of the reference station, and the rover, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variable in propagation delay (increase in apparent path length from satellite to rover receiver, or pseudo range) changes significantly for separation distances beyond 70 km. This is because the ionosphere is typically not homogeneous in its density of electrons, and because the electron density may change based on, for example, the sun's position and therefore time of day. Thus for surveying or other positioning systems which must work over larger regions, the surveyor must either place additional base stations in the regions of interest, or move his base stations from place to place. This range limitation has led to the development of more complex enhancements that have superseded the normal RTK operations described above, and in some cases eliminated the need for a base station GPS receiver altogether. This enhancement is referred to as the "Network RTK" or "Virtual Reference Station" (VRS) system and method.

Network RTK

Network RTK typically uses three or more GPS reference stations to collect GPS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network. The control center computer processor then applies a process which interpolates the atmospheric and/or satellite ephemeris errors at any given point within the network coverage area and generates a pseudo range correction comprising the actual pseudo ranges that can be used to create a virtual reference station. The control center then performs a series of calculations and creates a set of correction models that provide the rover with the means to estimate the ionospheric path delay from each satellite in view from the rover, and to take account other error contributions for those same satellites at the current instant in time for the rover's location.

The rover is configured to couple a data-capable cellular telephone to its internal signal processing system. The surveyor operating the rover determines that he needs to activate the VRS process and initiates a call to the control center to make a connection with the processing computer. The rover sends its approximate position, based on raw GPS data from the satellites in view without any corrections, to the control center. Typically, this approximate position is accurate to approximately 4-7 meters. The surveyor then requests a set of "modeled observables" for the specific location of the rover. The control center performs a series of calculations and creates a set of correction models that provide the rover with the means to estimate the ionospheric path delay from each satellite in view from the rover, and to take into account other error contributions for those same satellites at the current instant in time for the rover's location. In other words, the corrections for a specific rover at a specific location are determined on command by the central processor at the control center and a corrected data stream is sent from the control center to the rover. Alternatively, the control center may instead send atmospheric and ephemeris corrections to the rover which then uses that information to determine its position more precisely.

These corrections are now sufficiently precise that the high performance position accuracy standard of 2-3 cm may be determined, in real time, for any arbitrary rover position. Thus the GPS rover's raw GPS data fix can be corrected to a degree that makes it behave as if it were a surveyed reference location; hence the terminology "virtual reference station." An example of a network RTK system in accordance with embodiments of the present invention is described in U.S. Pat. No. 5,899,957, entitled "Carrier Phase Differential GPS Corrections Network," by Peter Loomis, assigned to the assignee of the present invention and incorporated as reference herein in its entirety.

The Virtual Reference Station method extends the allowable distance from any reference station to the rovers. Reference stations may now be located hundreds of miles apart, and corrections can be generated for any point within an area surrounded by reference stations. However, there are many construction projects where cellular coverage is not available over the entire physical area under construction and survey.

Exemplary Lifting Device

As described herein, the terms "lifting device" and "crane" generally refer to a construction machine used to perform work upon a work site and equipped with a data collector or and/or a controller, such as a machine control system capable of receiving instructions for guiding the use of the construction machine to carry out work operations upon a work site.

Figure 2:
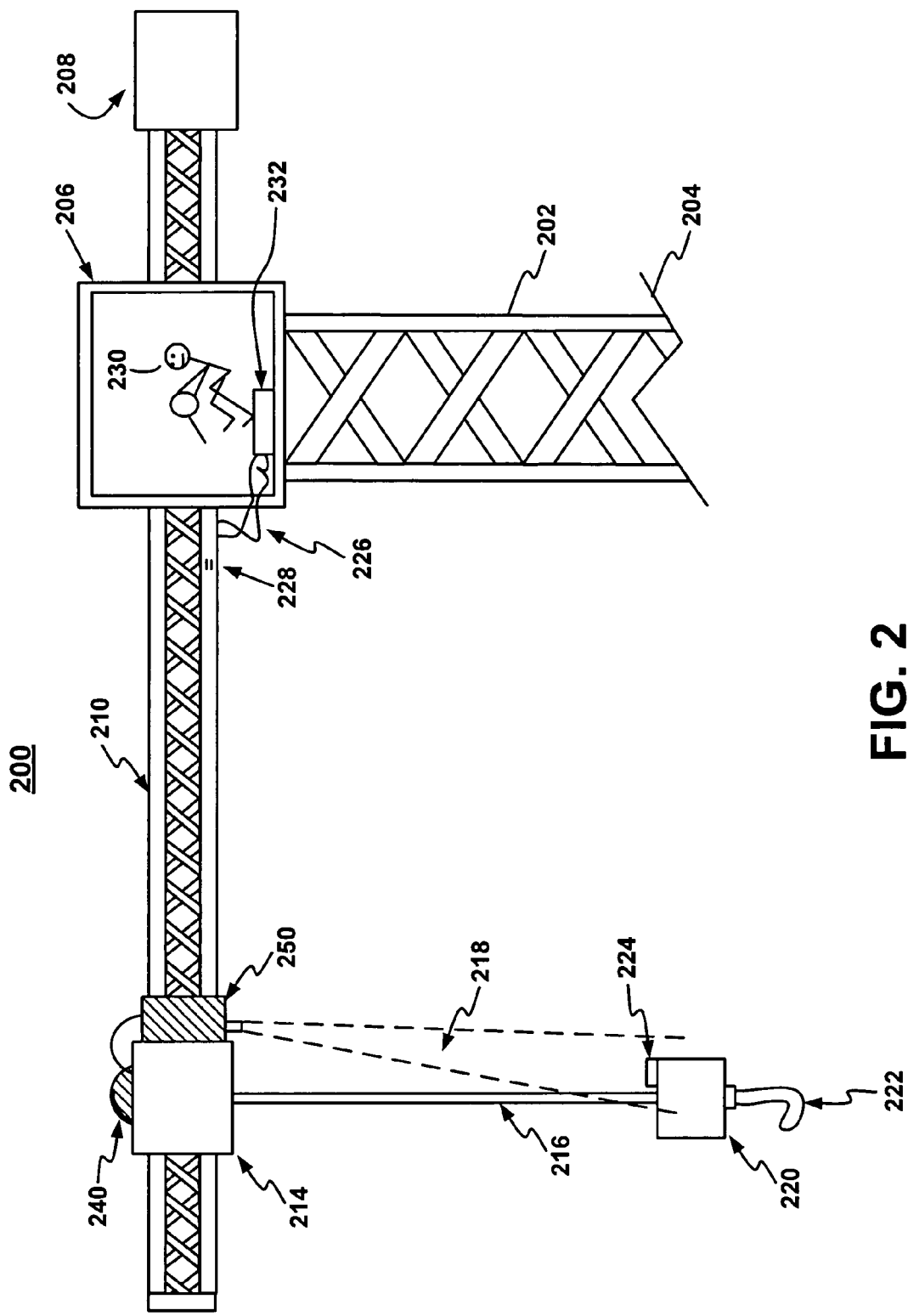
FIG. 2 is an illustration of an exemplary lifting device including a system for determining an autonomous position of a point of interest on the lifting device in accordance with embodiments of the present invention.

FIG. 2 is an illustration of an exemplary lifting device 200 including a system 250 for determining an autonomous position of a point of interest on the lifting device 200 in accordance with embodiments of the present invention.

Lifting device 200 is a tower crane that includes a base 204, a mast 202 and a jib (e.g., working arm) 210. The mast 202 may be fixed to the base 204 or may be rotatable about base 204. The base 204 may be bolted to a concrete pad (not shown) that supports the crane or may be mounted to a moveable platform (not shown). The operator 230 is located in a cab 206. Embodiments of the present invention enable determination of an autonomous position of various components of the lifting device in real-time.

A trolley 214 is moveable back and forth on jib 210 between the cab 206 and the end of the jib 210. A cable 216 couples a hook 222 and hook block 220 to trolley 214. A counterweight 208 is on the opposite side of the jib 210 as the trolley 214 to balance the weight of the crane components and the object being lifted (not shown).

In one embodiment of the invention, a position determiner module 250 provides location information indicating an autonomous position at the location of the position determiner 250. In one embodiment, the position determiner is coupled to a "point of interest."

For purposes of describing the present invention, a "point of interest" is a location on the crane that is monitored for position. For brevity and clarity, the point of interest on lifting device 200 is trolley 214. However, it is appreciated that the point of interest could be any location on lifting device 200, such as a point of work and it is also appreciated that there could be more than one point of interest on lifting device 200.

Deflections of the jib can be monitored with embodiments of the present invention. This enables an operator to detect crane motion of the lifting device due to wind, unstable ground, load, etc. Detection of these influences improves safety and operation of the lifting device. In some cases, a warning is provided when the motion of the lifting device is out of an expected range.

As such, monitoring the autonomous position of the point of interest can improve safety and efficiency of the lifting device 200. For example, usually a site map is used to organize and monitor activities on a construction site. The site map usually indicates (for example, with x and y coordinates) the location (or range of locations) of where the lifting device is planned or should be. Preparation in advance helps prevent accidents by giving adequate spacing between the crane and other objects on the site.

However, in some cases, the lifting device may be located where contact between the lifting device and another object is possible. It is important for the lifting device to not enter a restricted space where an accident could occur. Embodiments of the present invention can be used to prevent the lifting device from performing unplanned motions which can prevent the lifting device from entering restricted space.

An intelligent monitoring system of the present invention can measure the crane operator's performance against known metrics, best practices or predefined operating movements. Monitoring can be used to rate operators in training and/or a certification process. Additionally, the intelligent monitoring system of the present invention can be used to alert operators when they are not moving safely in terms of location, speed, acceleration, shock, load, jerk, etc. Monitoring can also be used to keep the lifting device within a predefined or preferred motion or path.

Furthermore, the system can be used to alert the operator of unsafe environmental conditions such as wind and unstable ground because the autonomous position would indicate some sort of deflection and or discrepancy between where the lifting device should be and where it actually is. Small deflections that would not normally be identified with conventional systems would be easily detected by the intelligent monitoring system of the present invention because it uses the autonomous position of a point of interest to monitor the lifting device. In one embodiment, the lifting device is monitored even when it is not is use.

Position determiner systems such as GPS sensors are good for motion control. These sensors can be used to automate the motion of the lifting device according to a pre-defined motion. In one embodiment, the predefined motion includes a desired path of movement between various points. In one embodiment, the preferred path may not necessarily be the shortest path. For example, the preferred path could be a one that avoids a potentially dangerous area.

The many degrees of freedom of the lifting device (e.g., jib extension, jib angle, trolley location, hook height, etc.) can be controlled and/or monitored and compared to a desired degrees of freedom to improve lifting device operation. The benefits include but are not limited to improved safety, improved utilization of the lifting device, reduced operating costs of the lifting device and improved site management.

In one embodiment of the invention, position determiner module 250 is communicatively coupled to antenna 240. The antenna 240 receives GNSS information (or other location information) that can be used to determine an autonomous position of the trolley 214. In one embodiment, the position determiner module 250 comprises a GPS receiver that receives GPS information that can be used to determine an autonomous position of the trolley 214. In one embodiment of the invention, the location information includes at least three dimensions of information. In one embodiment, the position information is updated at a rate of 10 Hz or better.

Embodiments of the present invention can determine an autonomous position that has an error of less than 10 centimeters. However, it is appreciated that many correction systems and methods could be used to determine an autonomous position that has an error of less than 1-2 centimeters. For example, RTK and VRS, as described above are examples of such correction systems. In one embodiment, GPS and RTK radios can be used to provide communication means in addition to satellite correction means. Likewise, cellular phones with VRS capability may be used for communication means and/or satellite correction means.

Once the autonomous position of the trolley is determined, it is possible to determine autonomous positions of other components of the lifting device 200. For example, once the location of the trolley 214 is determined, a distance can be measured between the trolley 214 and another object, such as hook block 220. The measured distance between the hook block 220 and the trolley 214 in addition to the autonomous position of the trolley 214 can be used to determine an autonomous position of the hook block 220.

In one embodiment, the position determiner module 250 includes a distance determiner for measuring a distance to other objects on the lifting device 200. In one embodiment, a laser is used to measure distance. For instance, a laser beam 218 can be emitted from the position determiner 250 toward the hook block 220. The hook block has reflective tape or a reflector 224 for reflecting the beam 218 back to the distance determiner. The time it takes for the beam to be reflected back can be used to determine the distance between the trolley 214 and the hook block 220.

In another embodiment, the position determiner module 250 is coupled with an image capturing device (not shown), such as a camera, for capturing images. The camera can be mounted on the trolley 214 and pointed downward to capture images of the hook 222. Having an image of the hook 222 would greatly assist a crane operator 230 in maneuvering the crane, especially in low visibility conditions.

The position determiner module 250 may include a transceiver for transmitting and receiving data. For example, the transceiver may report the location information of the point of interest to a receiver module (not shown).

In one embodiment, power is provided to the location determiner module 250 by power source 232. In one embodiment, the power source generates power from solar panels (not shown). However, in another embodiment, the power source 232 generates power from the motion of the lifting mechanism. Similar to a bicycle light that generates power from the movement of the tire, a generator could be coupled to the lifting device 200 in a way that enables power generation from the movement of the lifting device 200.

In one embodiment, the location determiner module 250 includes a battery (not shown). The battery can be re-charged by the power source 232 via contacts 228 when the trolley 214 is moved into position against the cab 206. Alternatively, wires from the power source 232 can be routed to provide direct power to the location determiner module 250.

Figure 3A:
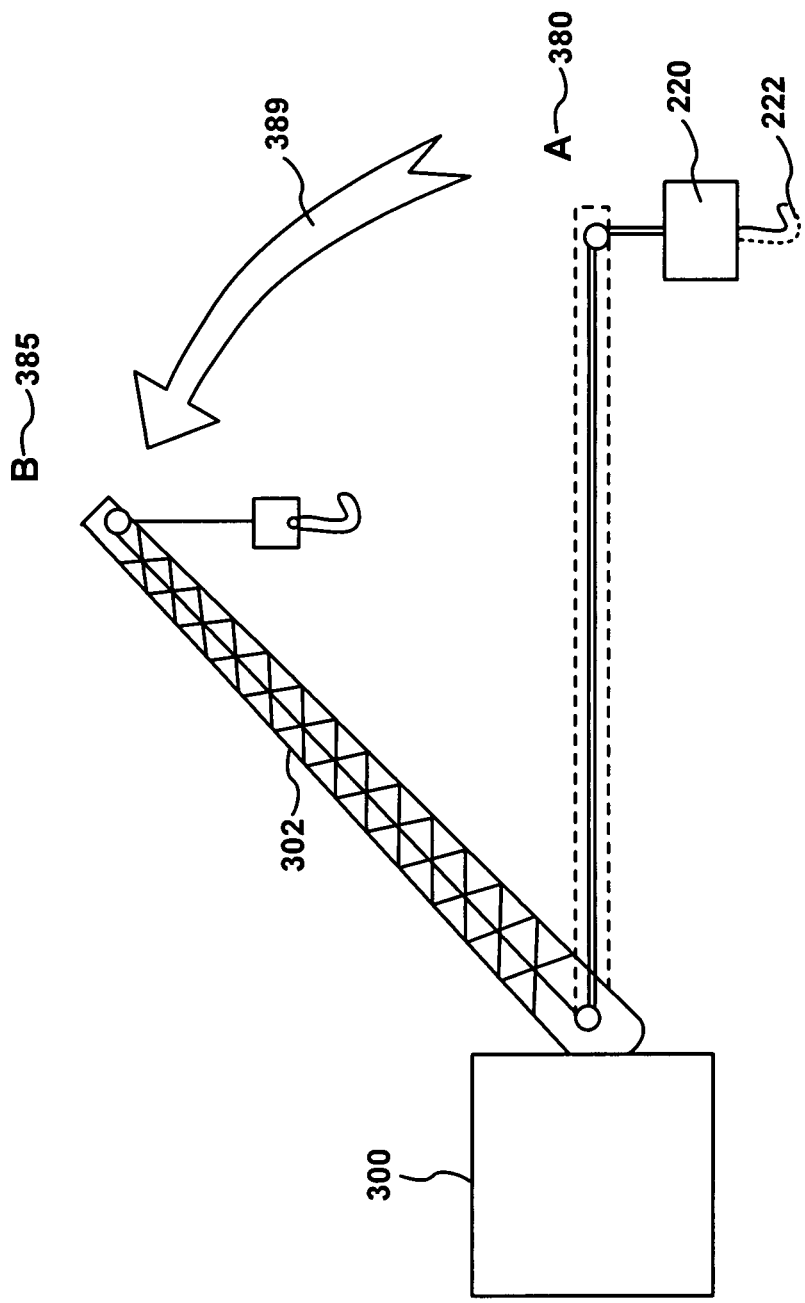
FIGS. 3A-3C are illustrations of an embodiment of the present invention implemented on a lifting device that does not have a fixed jib in accordance with embodiments of the present invention.
Figure 3B:
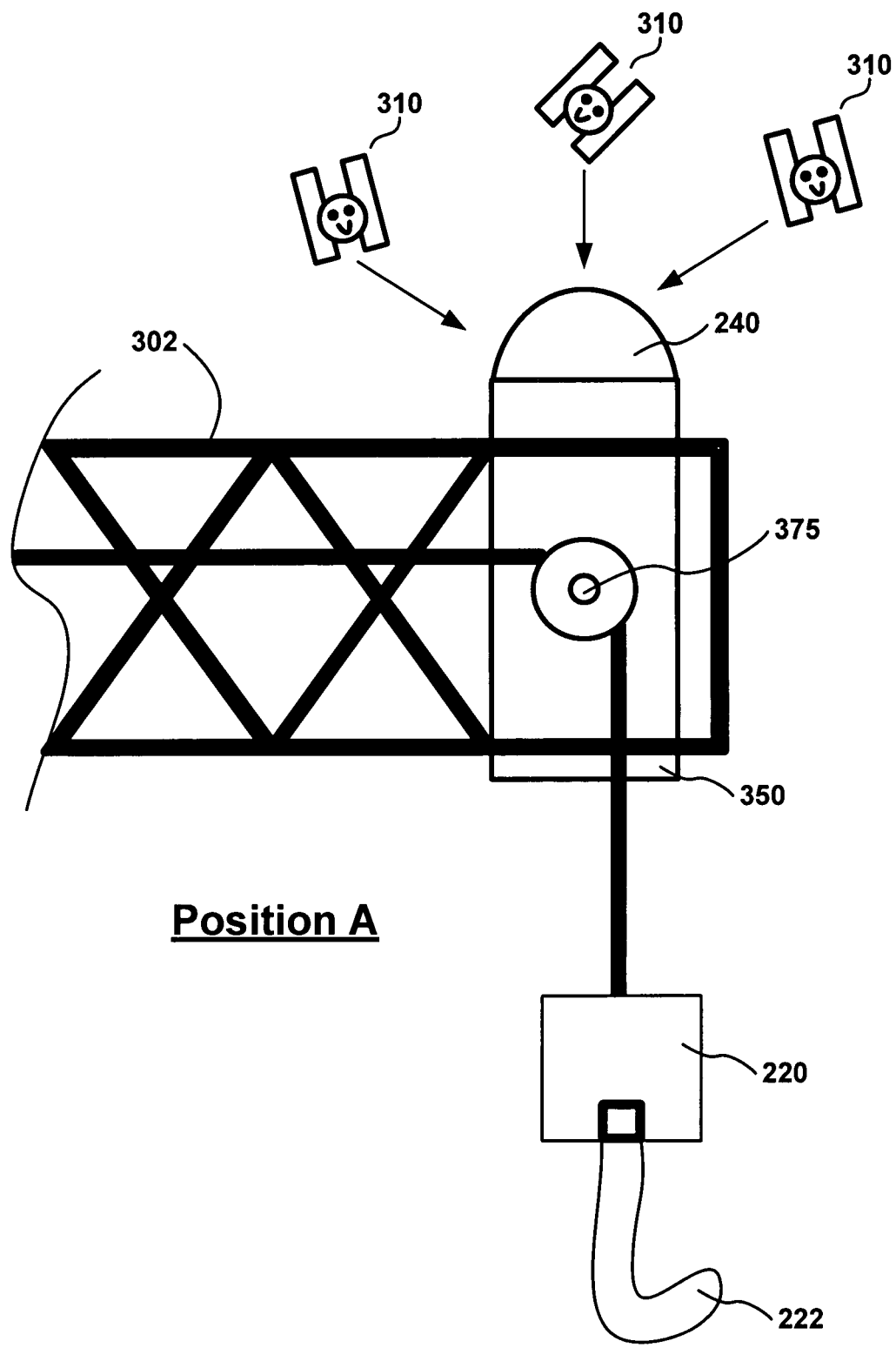
Figure 3C:
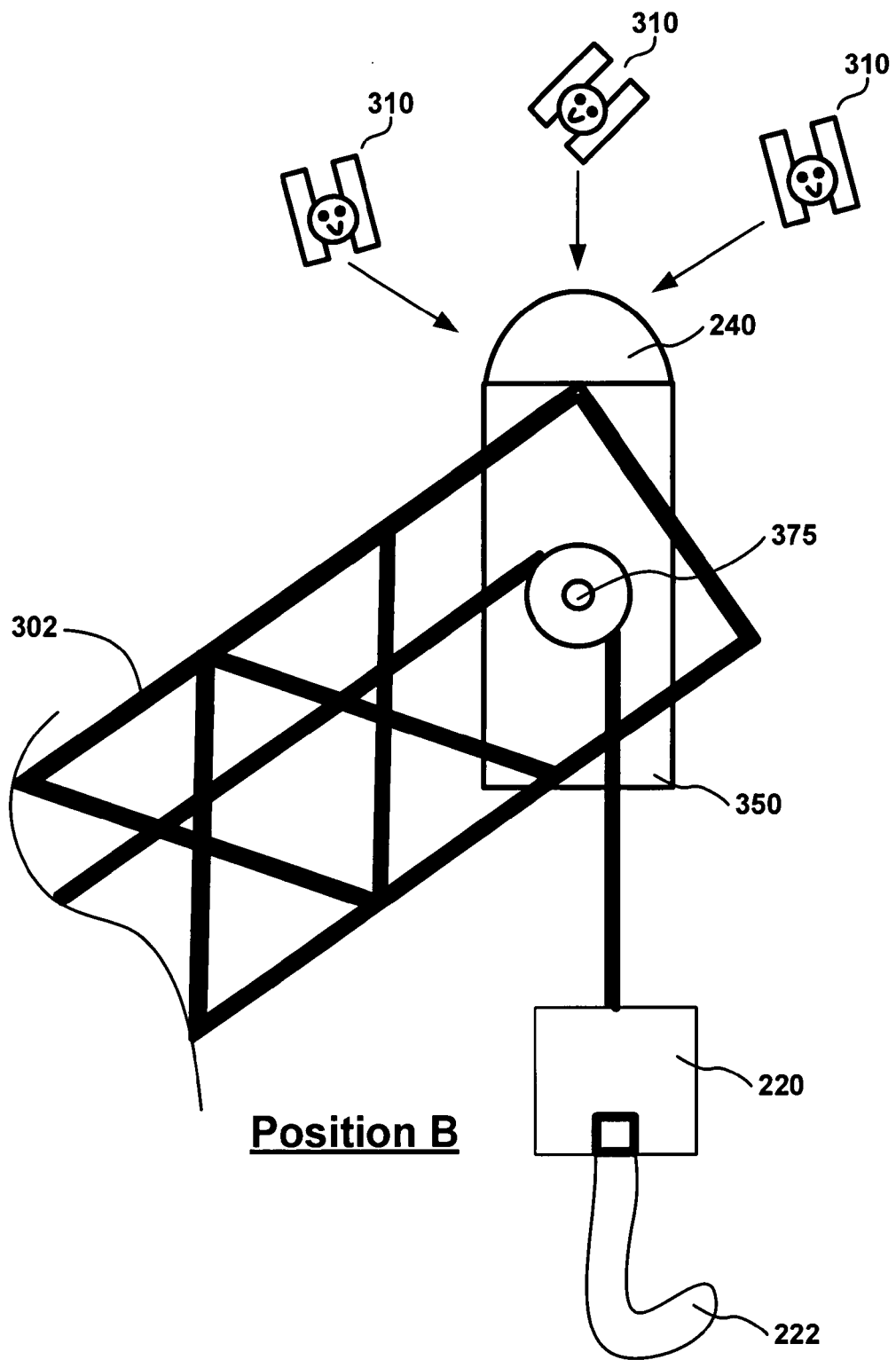

FIGS. 3A-3C are illustrations of an embodiment of the present invention implemented on a lifting device 300 that does not have a fixed jib 302. In this embodiment, the lifting device 300 can move 389 the jib 302 from position A 380 to position B 385. To keep the antenna 240 pointed upward towards satellites 310, the antenna 240 is mounted on a pivot 375. The pivot 375 enables the antenna 240 to maintain a vertical orientation which enables better reception for antenna 240.

In one embodiment, the camera 350, as described above is mounted on pivot 375 with the antenna 240. In this embodiment, the camera serves as the counterweight to maintain the vertical position of the antenna 240. This also enables the camera 350 to maintain a downward orientation to capture images towards the ground, such as images of the hook 222 and hook block 220.

FIG. 4 is a block diagram of an exemplary system 400 for monitoring a lifting device including monitoring an autonomous point of interest of the lifting device in accordance with embodiments of the present invention.

As stated above, position determiner module 250 may be coupled to a point of interest on the lifting device to enable the determination of an autonomous position of the point of interest. In one embodiment, the position determiner module 250 includes a location information receiver 402. As stated above, the location information receiver may be enabled to access GNSS information or any other information that can be used to determine an autonomous position. In one embodiment, the location information receiver includes a GPS receiver for receiving GPS coordinates indicating the autonomous position of the point of interest.

It is appreciated that safety and reliability of the position determiner module 250 is paramount. To increase reliability and reduce service intervals, in one embodiment, the position determiner module does not include moving parts. In another embodiment, the power supply 410 is rechargeable and/or can provide power reliably for long periods of time, possibly weeks or months without intervention.

The position determiner module 250 also includes or can be coupled with an optional distance determiner 412 for determining a distance between the point of interest and another location. As stated above, in one embodiment, the distance determiner 412 uses a laser to measure distance. However, it is appreciated that many different systems and methods could be used to measure distance in accordance with embodiments of the present invention.

The position determiner module can be coupled with or include an image capturing device 415. As stated above, the image capturing device may be a camera or any other image capturing device. In one embodiment, the camera is pivotally coupled to the lifting device.

The position determiner module 250 also includes a power supply 410. As stated above, power supply 410 may be a battery. However, in other embodiments of the present invention, the power supply is remote to the position determiner module 250 and could include power generation systems such as a solar panel or a generator. In one embodiment, the position determiner includes a rechargeable battery that is charged when electrical contacts on the position determiner module are coupled with a recharging system (not shown).

A transceiver 404 can communicate with a transceiver 451 of a lifting device monitor 450. The transceiver reports the location information accessed by the location information receiver 402 to the lifting device monitor 450. The transceiver 404 may also transmit the images from the image capturing device 415 to the lifting device monitor 450. In one embodiment, other information such as battery life may also be transmitted by transceiver 404 to the lifting device monitor 450. It is appreciated that the transceiver 404 may be a transmitter where information can only be sent and not received.

It is appreciated that transceiver 404 can communicate with transceiver 451 in any number of ways. In one embodiment, the communication is wireless. For example, Bluetooth, WiFi, spread spectrum, or any other wireless communication protocol can be used in accordance with the present invention. It is also appreciated that the communication between transceiver 404 and transceiver 451 may be secured, by encryption, for example.

The lifting device monitor 450 receives the location information and determines an autonomous position using autonomous position determiner 455. In one embodiment, an autonomous position is sent from the position determiner module 250. In this embodiment, the autonomous position determiner 455 accesses the autonomous position directly from position determiner The autonomous position of the point of interest is compared to a preferred motion 463. A lifting device controller 460 compares the autonomous position to a preferred or expected position. In one embodiment, the lifting device controller can generate motion commands to the lifting device to keep the lifting device position within the preferred motion 463. It is appreciated that control commands can include instructions for manual operation or can also include instructions for automatic control of the lifting device.

The lifting device controller 460 may also provide a warning in response to the autonomous position being different from the preferred motion 463. It is appreciated that embodiments of the present invention can be used in a "cab free" lifting environment where the operator of the lifting device is on the ground and controls the lifting device remotely.

It is also appreciated that embodiments of the present invention are well suited to be used in conjunction with software modeling. For example, software can be used to generate a three dimensional "virtual lift" where the path of the lifting device is planned virtually. Performing a virtual lift can reduce risk, in part because contingency plans can be determined in advance. In addition, the lift can be "seen" prior to physically doing anything. Potential problems can be identified and worked around in advance.

Once the virtual lift is completed, the preferred motion or path of the virtual lift can be uploaded to the lifting device monitor 450. The preferred motion of the virtual lift can be used to automatically control the lifting device and/or can be used as a guide for manual operation of the lifting device.

Figure 5:
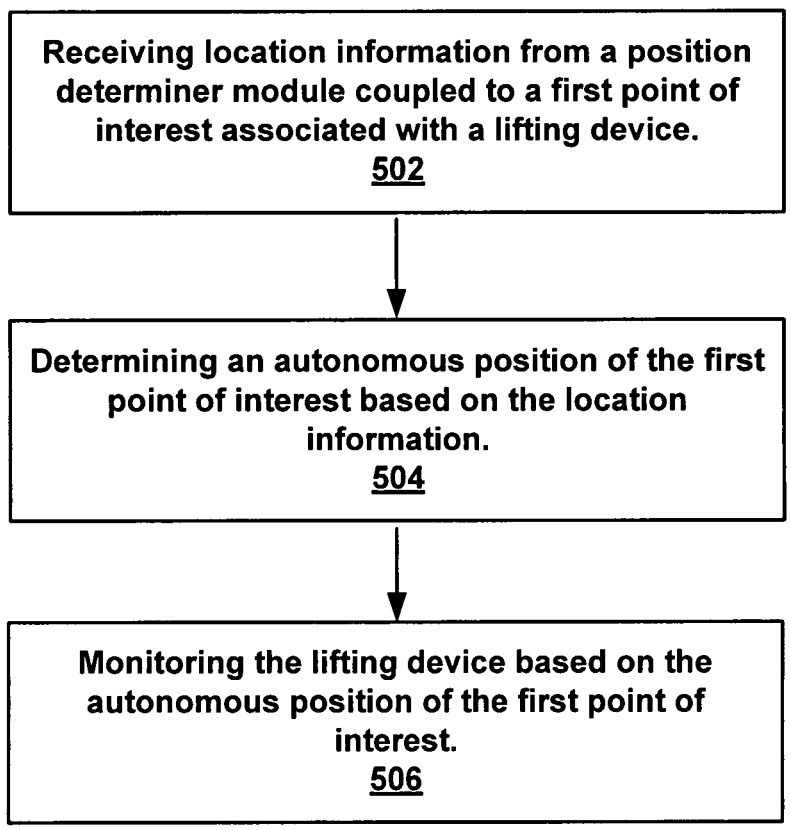
FIG. 5 is a flow diagram of an exemplary method for monitoring a lifting device in accordance with embodiments of the present invention.

FIG. 5 is a flow diagram of an exemplary method 500 for monitoring a lifting device in accordance with embodiments of the present invention.

At 502, 500 includes receiving location information from a position determiner module coupled to a first point of interest associated with a lifting device. As stated above, the lifting device could be a crane or any other lifting device. In one embodiment, the point of interest is the working end of the crane. However, it is appreciated that the point of interest could be any location on the lifting device.

At 504, 500 includes determining an autonomous position of the first point of interest based on the location information. In one embodiment, the autonomous location defines coordinates in three dimensions of the exact location of the point of interest is in space. The autonomous location of the present invention has an error of less than 10 centimeters and in one embodiment, has an error of less than 2 centimeters. Error correction such as RTK and VRS, as described above can be used to reduce the error of the autonomous position determined in 504.

At 506, 500 includes monitoring the lifting device based on the autonomous position of the first point of interest. In one embodiment, the autonomous position determined in 504 is compared to a preferred or expected value. When the autonomous location differs from the expected or preferred location, a warning can be provided. In another embodiment, when the autonomous location differs from the expected or preferred location, directions are provided to operate the lifting device within the preferred or expected location.

FIG. 6 is a flow diagram of an exemplary method 600 for monitoring a lifting device with respect to a preferred movement in accordance with embodiments of the present invention.

At 602, 600 includes determining at least one preferred movement of a first point of interest of a lifting device for moving an object from a first point to a second point. It is appreciated that 602 can be performed for a lifting device that does not have a load. In one embodiment, the preferred movement includes a preferred path between two points.

At 604, 600 includes receiving location information from a position determiner module coupled with the first point of interest.

At 606, 600 includes determining an autonomous position of the first point of interest based on the location information received in 604. In one embodiment, the autonomous position includes GNSS data indicating the location of the first point of interest within 5 or less centimeters.

At 608, 600 includes monitoring the autonomous position of the first point on interest with respect to the preferred movement. In one embodiment, monitoring the autonomous position of the first point on interest with respect to the preferred movement includes generating instructions to correct the location of the first point of interest with respect to the preferred location.

Collision Avoidance

Embodiments of the present invention can be used to prevent collisions. For example, the autonomous position of a first lifting device can be compared to the autonomous position of another lifting device and/or other objects and when the objects breach a safety zone, a warning can be generated to warn the operator of a potential collision. In one embodiment, a safety threshold distance is used to help prevent collisions.

Furthermore, when the point of interest is where it is supposed to be or expected to be, a warning can be generated to alert the discrepancy. In another embodiment, the autonomous position of the point of interest can be compared to pre-defined "do not enter" spaces. In this embodiment, pre-planning establishes areas or zones that should not be entered by particular devices. When it is determined that a point of interest has entered a "do not enter" zone, a warning can be generated and provided to the operator. The warning can help prevent collisions between the lifting device and other objects.

It is appreciated that the autonomous position of the lifting device can be used to generate a real-time graphical representation of a work site. In one embodiment, the autonomous position of the lifting device is reported to a remote location where the activity can be monitored.

Figure 7:
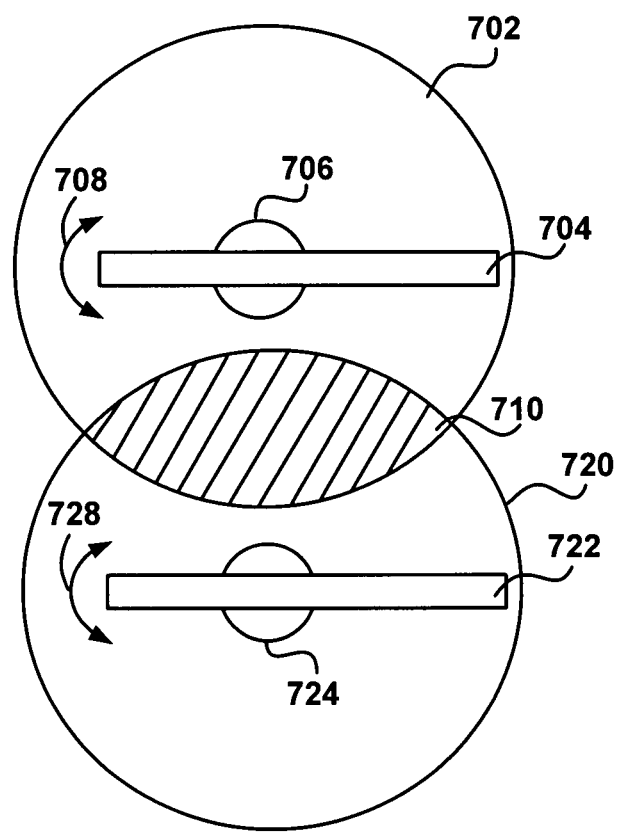
FIG. 7 is a top view of an exemplary work site comprising two lifting devices and in accordance with embodiments of the present invention.

FIG. 7 is a top view of an exemplary work site 700 comprising two lifting devices 704 and 722 in accordance with embodiments of the present invention. As shown in FIG. 7, lifting device 704 can rotate 708 about pivot 706. At any given time, lifting device 704 can be within space 702. It is appreciated that space 702 may be a two dimensional area or in another embodiment, space 702 is a three dimensional volume.

Lifting device 722 can rotate 728 about pivot 724. At any given time, lifting device 722 can be within space 720. It is appreciated that space 720 may be a two dimensional area or in another embodiment, space 720 is a three dimensional volume.

Space 702 overlaps space 720 at region 710. Within region 710, it is possible that lifting device 704 could contact lifting device 722. Embodiments of the present invention can be used to prevent lifting devices 704 and 722 from colliding. For example, when lifting device 704 is within space 710, lifting device 722 is warned when it is approaching space 710. Embodiments of the invention can be used to ensure that only one of the lifting devices is in the space of possible contact 710.

Embodiments of the present invention are thus described. While the present invention has been described in particular embodiments, it should be appreciated that the present invention should not be construed as limited by such embodiments, but rather construed according to the following claims.

I claim:

1. A method for monitoring a lifting device comprising:
utilizing a position determiner module coupled to a first point of interest to generate location information about said first point of interest, said first point of interest moveably coupled with a jib pivot via a cable and said first point of interest capable of traversing at least a portion of a jib of said lifting device, a first counterweight attached to said jib, said jib pivot moveably coupled with said jib, wherein said first point of interest, said jib pivot, and said cable are approximately vertically above a hook block;
determining a distance between said first point of interest and said hook block using a distance determiner in proximity of said first point of interest;
determining an autonomous position of said first point of interest as coordinates in three dimensions based on said location information using a position determiner module, said autonomous position does not depend on physical interactions and relationships between components of said lifting device, said position determiner does not include any moving parts;
maintaining a vertical orientation of an antenna as a vertical angle of said jib changes using a second counterweight coupled with said position determiner module, said antenna is coupled with and used by said position determiner module; and
monitoring said lifting device based on a comparison of said autonomous position of said first point of interest to an expected position in a planned virtual lift path of a physical environment.

2. The method of claim 1 wherein said position determiner is substantially compatible with a GNSS (Global Navigation Satellite System).

3. The method of claim 1 wherein said position determiner is pivotally coupled to said first point of interest.

4. The method as described in claim 1 further comprising:
providing power to said position determiner from a power source coupled to said lifting device.

5. The method of claim 4 wherein said power source comprises a solar power generation module.

6. The method of claim 4 wherein said power source generates said power from motion associated with said lifting device.

7. The method of claim 1 wherein said autonomous position is precise to less than ten centimeters of error.

8. The method of claim 1 wherein said autonomous position of said first point of interest is not extrapolated from a position of another component of said lifting device.

9. The method of claim 1 wherein said location information is received wirelessly.

10. The method of claim 1 further comprising:
determining an autonomous position of a second point of interest based on said autonomous position of said first point of interest.

11. The method of claim 10 wherein said autonomous position of said second point of interest is determined by measuring said distance between said first point of interest and said second point of interest, wherein said second point of interest is said hook block.

12. The method of claim 11 wherein said distance between said first point of interest and said second point of interest is measured optically.

13. The method of claim 11 wherein said distance between said first point of interest and said second point of interest is measured sonically.

14. The method as described in claim 1 wherein said lifting device is a crane.

15. The method as described in claim 1, wherein the second counterweight includes an image capturing module and wherein the method further comprisese:
receiving an image from said image capturing module coupled to said first point of interest.

16. A system for monitoring a lifting device comprising:
a first point of interest coupled with a cable, said first point of interest moveably coupled with a jib pivot via said cable and said first point of interest capable of traversing at least a portion of a jib of said lifting device, a first counterweight attached to said jib, said jib pivot moveably coupled with said jib, wherein said first point of interest, said jib pivot, and said cable are approximately vertically above a hook block;
a distance determiner for determining a distance between said first point of interest and said hook block;
a position determiner module including said distance determiner and coupled to said first point of interest to generate location information about said first point of interest, said location information indicating an autonomous position of said first point of interest as coordinates in three dimensions, said autonomous position does not depend on physical interactions and relationships between components of said lifting device, said position determiner does not include any moving parts;
a second counterweight coupled with said position determiner such that said counterweight causes an antenna of said position determiner module to maintain a vertical orientation as a vertical angle of said jib changes;
a location receiver module for receiving location information from said position determiner module; and
a lifting device monitoring module for monitoring said lifting device based on a comparison of said autonomous position of said first point of interest to an expected position in a planned virtual lift path of a physical environment.

17. The system of claim 16 wherein said position determiner is substantially compatible with a GNSS (Global Navigation Satellite System).

18. The system of claim 16 wherein said position determiner is pivotally coupled to said first point of interest.

19. The system as described in claim 16 further comprising:
a power source electrically coupled to said position determiner and physically coupled to said lifting device.

20. The system of claim 19 wherein said power source comprises a solar power generation module.

21. The system of claim 19 wherein said power source generates said power from motion associated with said lifting device.

22. The system of claim 16 wherein said autonomous position is precise to less than ten centimeters of error.

23. The system of claim 16 wherein said autonomous position of said first point of interest is not extrapolated from a position of another component of said lifting device.

24. The system of claim 16 wherein said location information is received by said location receiver module wirelessly from said position determiner.

25. The system of claim 16 further comprising:
said distance determiner for determining an autonomous position of a second point of interest based on said autonomous position of said first point of interest, wherein the second point of interest is said hook block.

26. The system of claim 25 wherein said autonomous position of said second point of interest is determined by measuring said distance between said first point of interest and said second point of interest.

27. The system of claim 26 wherein said distance between said first point of interest and said second point of interest is measured optically.

28. The system of claim 26 wherein said distance between said first point of interest and said second point of interest is measured sonically.

29. The system of claim 16 wherein said lifting device is a crane.

30. The system of claim 16, wherein the second counterweight includes an image capturing module and wherein the system further comprises:
an image receiver for receiving an image from said image capturing module coupled to said first point of interest.

31. A method for improving utilization of a lifting device comprising:
determining, based on a planned virtual lift path, at least one preferred movement of a first point of interest of said lifting device for moving an object from a first point to a second point, said first point of interest moveably coupled with a jib pivot via a cable and said first point of interest capable of traversing at least a portion of a jib of said lifting device, a first counterweight attached to said jib, said jib pivot moveably coupled with said jib, wherein said first point of interest, said jib pivot, and said cable are approximately vertically above a hook block;
determining a distance between said first point of interest and said hook block using a distance determiner in proximity of said first point of interest;
utilizing a position determiner module coupled to said first point of interest via said jib pivot to generate location information about said first point of interest, said position determining including said distance determiner, said position determiner does not include any moving parts;
maintaining a vertical orientation of an antenna as a vertical angle of said jib changes using a second counterweight coupled with said position determiner module, said antenna is coupled with and used by said position determiner module;
determining an autonomous position of said first point of interest based on said location information as coordinates in three dimensions, said autonomous position does not depend on physical interactions and relationships between components of said lifting device; and monitoring said autonomous position of said first point of interest with respect to said preferred movement of said planned virtual lift path of a physical environment.

32. The method of claim 31 further comprising:
determining a difference between said autonomous position of said first point of interest and said preferred movement.

33. The method of claim 32 further comprising:
providing control information to said lifting device such that said control information indicates a relationship between said preferred movement and said autonomous position of said first point of interest.

34. The method of claim 31 wherein said preferred movement minimizes an amount of time it takes to move said object from said first point to said second point.

35. The method of claim 31 wherein said preferred movement prevents said first point of interest from entering a pre-defined space.

36. The method of claim 31 wherein said position determiner is substantially compatible with a GNSS (Global Navigation Satellite System).

37. The method of claim 31 wherein said position determiner is pivotally coupled to said first point of interest.

38. The method as described in claim 31 further comprising:
providing power to said position determiner from a power source coupled to said lifting device.

39. The method of claim 38 wherein said power source comprises a solar power generation module.

40. The method of claim 38 wherein said power source generates said power from motion associated with said lifting device.

41. The method of claim 31 wherein said autonomous position is precise to less than ten centimeters of error.

42. The method of claim 31 wherein said autonomous position of said first point of interest is not extrapolated from a position of another component of said lifting device.

43. The method of claim 31 wherein said location information is received wirelessly.

44. The method of claim 31 further comprising:
determining an autonomous position of a second point of interest based on said autonomous position of said first point of interest.

45. The method of claim 44 wherein said second point of interest is said hook block and wherein said autonomous position of said second point of interest is determined by measuring said distance between said first point of interest and said second point of interest.

46. The method of claim 45 wherein said distance between said first point of interest and said second point of interest is measured optically.

47. The method of claim 45 wherein said distance between said first point of interest and said second point of interest is measured sonically.

48. The method of claim 31 wherein said lifting device is a crane.

49. The method of claim 31, wherein said second counterweight includes an image capturing module and wherein the method further comprises:
receiving an image from said image capturing module coupled to said first point of interest.

50. The method of claim 31 wherein said preferred movement is a path between said first point and said second point.

51. A method for preventing lifting device collisions comprising:

utilizing a position determiner module coupled to a first point of interest to generate location information about said first point of interest, said first point of interest moveably coupled with a jib pivot via a cable and said first point of interest capable of traversing at least a portion of a jib of said lifting device, a first counterweight attached to said jib, said jib pivot moveably coupled with said jib, wherein said first point of interest, said jib pivot, and said cable are approximately vertically above a hook block, wherein said location information includes corrected pseudoranges;

determining a distance between said first point of interest and said hook block using a distance determiner in proximity of said first point of interest;

determining an autonomous position of said first point of interest using a position determiner module based on said location information as coordinates in three dimensions, said autonomous position does not depend on physical interactions and relationships between components of said lifting device and without using any moving parts;

maintaining a vertical orientation of an antenna as a vertical angle of said jib changes using a second counterweight coupled with said position determiner module, said antenna is coupled with and used by said position determiner module;

monitoring said lifting device based on a comparison of said autonomous position of said first point of interest to an expected position in a planned virtual lift path of a physical environment; and comparing said autonomous position of said first point of interest to location information associated with an object proximate said lifting device to prevent said lifting device from colliding with said object.

52. The method claim 51 further comprising:
generating a warning in response to said autonomous position of said first point of interest is within a threshold distance of said object proximate said lifting device.

53. The method of claim 51 wherein said location information associated with an object proximate said lifting device includes a threshold safety distance.

54. The method of claim 51 wherein said position determiner is substantially compatible with a GNSS (Global Navigation Satellite System).

55. The method of claim 51 wherein said position determiner is pivotally coupled to said first point of interest.

56. The method as described in claim 51 further comprising:
providing power to said position determiner from a power source coupled to said lifting device.

57. The method of claim 56 wherein said power source comprises a solar power generation module.

58. The method of claim 56 wherein said power source generates said power from motion associated with said lifting device.

59. The method of claim 51 wherein said autonomous position is precise to less than ten centimeters of error.

60. The method of claim 51 wherein said autonomous position of said first point of interest is not extrapolated from a position of another component of said lifting device.

61. The method of claim 51 wherein said location information is received wirelessly.

62. The method of claim 51 further comprising:
determining an autonomous position of a second point of interest based on said autonomous position of said first point of interest.

63. The method of claim 62 wherein said second point of interest is said hook block and wherein said autonomous position of said second point of interest is determined by measuring said distance between said first point of interest and said second point of interest.

64. The method of claim 63 wherein said distance between said first point of interest and said second point of interest is measured optically.

65. The method of claim 63 wherein said distance between said first point of interest and said second point of interest is measured sonically.

66. The method as described in claim 51 wherein said lifting device is a crane.

67. The method as described in claim 51, wherein said second counterweight includes an image capturing module and wherein the method further comprises:
  receiving an image from said image capturing module coupled to said first point of interest.

* * * * *

UNITED STATES PATENT AND TRADEMARK OFFICE
CERTIFICATE OF CORRECTION

| | |
|---|---|
| PATENT NO. | : 9,156,167 B2 |
| APPLICATION NO. | : 11/803830 |
| DATED | : October 13, 2015 |
| INVENTOR(S) | : John Cameron |

It is certified that error appears in the above-identified patent and that said Letters Patent is hereby corrected as shown below:

In the Claims

Column 13, Line 27, Claim 15: Delete: "comprisese:"
Insert: --comprises:--

Signed and Sealed this
Twenty-eighth Day of June, 2016

Michelle K. Lee
*Director of the United States Patent and Trademark Office*